(12) United States Patent
Detch

(10) Patent No.: US 8,166,966 B2
(45) Date of Patent: May 1, 2012

(54) DISH REFLECTOR CONCENTRATOR STRUCTURE

(76) Inventor: John W. Detch, Ventura, CA (US)

( * ) Notice: Subject to any disclaimer, the term of this patent is extended or adjusted under 35 U.S.C. 154(b) by 304 days.

(21) Appl. No.: 12/456,818

(22) Filed: Jun. 24, 2009

(65) Prior Publication Data

US 2010/0326425 A1    Dec. 30, 2010

(51) Int. Cl.
*F24J 2/12*    (2006.01)
(52) U.S. Cl. ........ 126/684; 126/686; 126/690; 126/694; 126/696
(58) Field of Classification Search ................ 126/600, 126/684, 686, 690, 694, 696, 640; 359/850, 359/851, 852, 853
See application file for complete search history.

(56) References Cited

U.S. PATENT DOCUMENTS

| | | | |
|---|---|---|---|
| 4,583,520 A * | 4/1986 | Dietrich et al. | ............... 126/606 |
| 4,784,700 A | 11/1988 | Stern et al. | |
| 5,374,317 A | 12/1994 | Lamb et al. | |
| 5,640,950 A | 6/1997 | Cordy, Jr. | |
| 6,485,152 B2 | 11/2002 | Wood | |

* cited by examiner

*Primary Examiner* — Alfred Basichas
(74) *Attorney, Agent, or Firm* — J. E. McTaggart

(57) ABSTRACT

In a reflector dish, a small quantity of elongate mirror-surfaced reflector panels are structurally integrated with a support framework that is configured to enable convenient shipping and on-site assembly and erection of a reflector dish assembly with an effective reflecting surface that closely approximates a desired parabolic dish shape with short focal length, synthesized from combination of the reflector panels originally procured as flat rectangular sheet metal panels and formed to provide the desired dish curvature. The panels can be conveniently shipped to location along with a corresponding quantity of reinforced crescent-shaped support frames to which the panels are made to attach as structural elements, by novel attachment hardware, for erection at the operational site.

10 Claims, 3 Drawing Sheets

US 8,166,966 B2

DISH REFLECTOR CONCENTRATOR STRUCTURE

FIELD OF THE INVENTION

The present invention relates to the field of dish reflectors and more particularly to the structure of a rectangular reflector dish for a solar heat concentrator. The dish is readily assembled from a small quantity of cost-effective curve-shaped elongate panels.

BACKGROUND OF THE INVENTION

Typically, reflector dishes are circular with polar cross-sectional shape that is parabolic and made to be symmetrical about a central axis. Solar concentrators have been formed as arrays of elongated horizontal troughs with a vertical cross-sectional shape that extends uniformly to a designated full horizontal length; the vertical cross sectional shape is typically parabolic and symmetrical about the horizontal axis. Circular dishes have been manufactured from small, curved, typically square or hexagonal tiles.

It is known to fabricate such reflectors from strips, panels or segments for purposes of facilitating the handling and shipping of large reflector assemblies. In addition to the requirement for a suitable reflective surface, design considerations include parametric options such as segment size, inversely-related segment quantity and sophistication of segment curvature which can be zero (flat) or curved in one axis or two axes, in addition to mechanical mounting and environmental wind/weather considerations. NOTE: for purposes of the present descriptions, the terms X-axis and Y-axis refer to a dish that is shaped symmetrically about a Z axis, and the terms horizontal and vertical refer to the X-axis and Y-axis respectively in the case where the Z axis is horizontal, i.e. the dish on earth aimed at the horizon.

DISCUSSION OF KNOWN ART

U.S. Pat. No. 6,485,152 B2 to Wood discloses a MATRIX SOLAR DISH with fixed slender glass mirrors patterned from orthogonal planes parallel to the axis of symmetry of a paraboloid and intersecting the paraboloid, making the all parabolic trusses uniform.

U.S. Pat. No. 5,640,950 to Cordy, Jr., discloses a SIMPLIFIED CRADLE AND DISH FOR A SOLAR-POWERED HIGH-PRESSURE STEAM GENERATOR with a cradle that permits a concentrator dish to rotate around the declination axis to follow the sun through its seasonal motions.

U.S. Pat. No. 5,374,317 to Lamb et al discloses a MULTIPLE REFLECTOR CONCENTRATOR SOLAR ELECTRIC POWER SYSTEM that uses multiple reflectors to concentrate sun light onto a panel of photo-voltaic (PV) cells.

U.S. Pat. No. 4,784,700 to Stem et al discloses a POINT FOCUS SOLAR CONCENTRATOR USING REFLECTOR STRIPS OF VARIOUS GEOMETRIES TO FORM PRIMARY AND SECONDARY REFLECTORS, i.e. "cylindrical reflector strips some of which are tilted to simulate a point focus by overlaying the line focii of each segment at a coincident point".

OBJECTS OF THE INVENTION

It is an object to provide a structural solution for a reflector dish suitable for concentrating sun rays for purposes of energy recovery power generation that will prove to be practical, cost-effective, highly efficient, easy to manufacture, transport, and assemble on site from a reasonably small number of component parts, and that will perform reliably under normal to extreme weather-related variations including temperature, humidity, precipitation, and wind conditions.

SUMMARY OF THE INVENTION

These and other objects and advantages have been realized in a reflector structure that integrates the reflector elements with their support structure and that enables site erection of a reflecting surface that closely approximates a desired dish contour curve with parabolic radian shape about an axis of symmetry. The reflecting surface is synthesized from a small quantity N of mirror-surfaced panels originally procured as flat rectangular metal panels and shaped in a novel forming process to have the desired curvature: concave on the reflective side. The panels are shipped along with a corresponding small quantity N+1 of support frames to which the panels are attachable by novel attachment hardware for erection at the operational site.

These and other objects and advantages of the present invention will become apparent from the following more detailed description, taken in conjunction with the accompanying drawings which illustrate the invention, by way of example.

DETAILED DESCRIPTION

Figure 1:
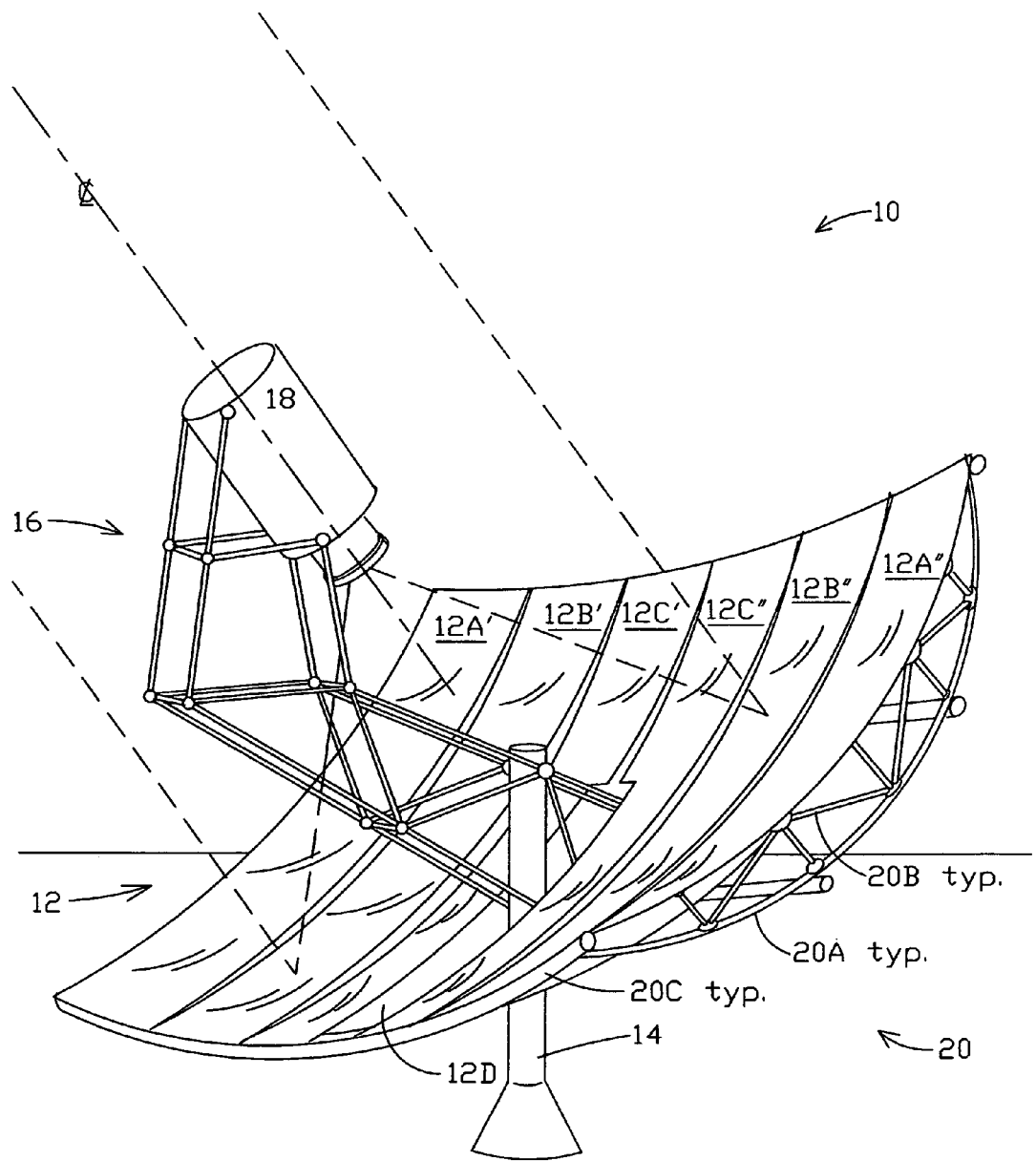
FIG. 1 is a perspective view of a solar reflector installation utilizing a reflector dish structure in accordance with a preferred embodiment of the present invention.

FIG. 1 is a perspective view of a solar reflector installation 10 utilizing a parabolic reflector dish structure 12 in accordance with a preferred embodiment of the present invention. A ground support post 14 supports the reflector dish structure 12 along with a receptor support frame 16 which is rigidly attached to the reflector dish structure 12 and supports a receptor 18 with its thermal element located at the focal point of dish structure 12.

The reflector dish structure 12 includes a rear dish support framework 20 to which receptor 18 is attached by support frame 16, forming an integral movable structural, unit that is attached to the stationary ground support post 14 in a swivel manner. A motor drive mechanism enables the structural unit to be rotated for azimuth angle and tilted for inclination angle under computer control so as to track the reflective surface with the movement of the sun, keeping the sun's rays reflected to the focal point on receptor 18 as indicated by the broken lines. Clearance for such movement of the movable structural unit is provided by portions cut away from panels 12C' and 12C" and rear support framework 20 to form clearance slot 12D.

For purposes of the present descriptions, unless indicated otherwise, the dish structure is presumed to be oriented with its central axis, i.e. X-axis oriented horizontal and its Y-axis oriented vertical, the reflective side of the mirror dish being referred to as the front side.

In the embodiment shown, the reflector surface of dish structure 12 is made up from six generally rectangular side-by-side panels: 12A (two places), 12B (two places), 12C' and 12C", each shaped with curvature to closely approximate a desired parabolic surface shape and finished to have an efficient reflective surface.

The panels 12A-12C" forming the reflector surface are assembled on-site by attachment to the structural framework 20 which includes vertical arches 20A, reinforcing trusses 20B and horizontal stringers 20C all attached together structurally with the panels 12A-12C" as part of an integral structure that can be readily assembled on-site from panels and sub-assemblies of support structure that can all be readily transported to the site.

Figure 2:
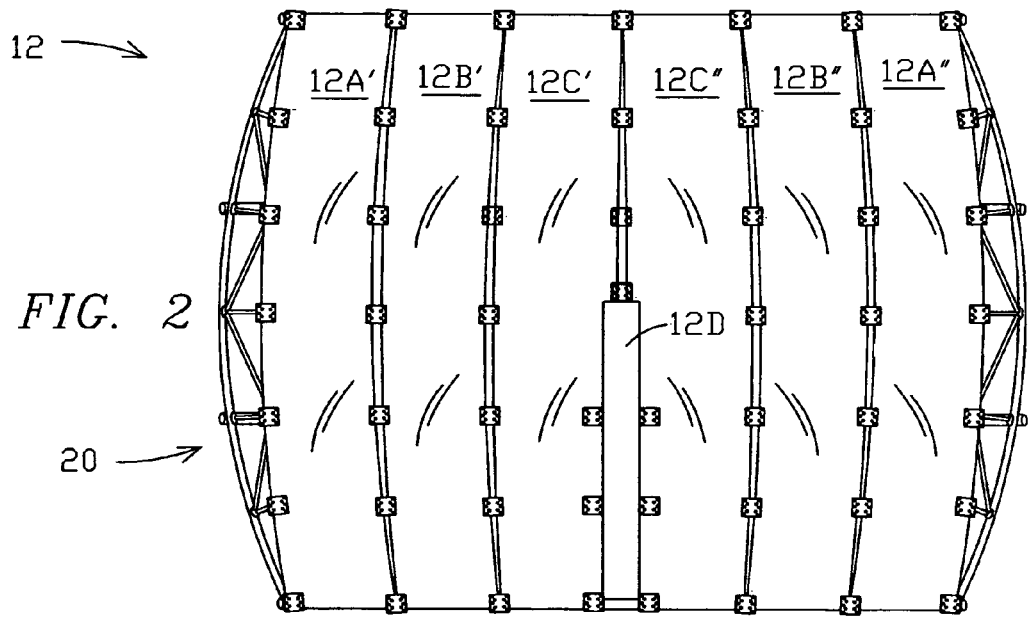
FIG. 2 is a front elevation of the reflector dish structure of FIG. 1, removed from the base support and receptor assembly.

FIG. 2 is a front view of dish structure 12 of FIG. 1, showing six panels located side-by-side: two panels 12A, two panels 12B, panel 12C' and panel 12C". These panels are originally fabricated from substantially rectangular flat sheet metal stock, which are then formed in a process to have the desired parabolic curvature in both X and Y axes. Panels 12A are identical and panels 12B are identical: in each pair one is inverted relative to the other, to form mirror images of each other. Panels 12C' and 12C" may be identical originally, each with a cutout portion to form opening 12D, then, with one reversed relative to the other, they become mirror-images of each other; they are then formed to the parabolic shape as shown. Once the panels have been formed to final shape, their reflective surface can be applied in a suitable manner, e.g.: the surface of the metal itself can be polished and sealed with a coating that resists oxidizing or an appropriate specialized reflective coating such as a silvered mirror or silicon oxide glass coating may be applied.

The rear support framework 20 seen at the left and right side of FIG. 2 is attached to the rear side of the six panels 12A-12C" in such a manner that the six panels themselves become part of the structural entity. Clearance slot 12D is seen in the lower central region. Fastening plates 22 arranged in an array as shown are each backed by a similar attachment plate on the rear as shown in FIGS. 4, 5 and 6.

Figure 3:
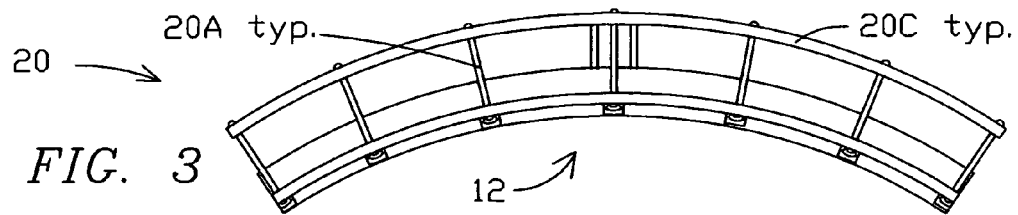
FIG. 3 is a top view of the reflector dish structure of FIG. 2

FIG. 3 is a top view of the dish structure 12 of FIG. 2 showing support structure 20 with seven Y-axis spacer struts 20A stabilized by attachment to horizontal rear stringer struts 20C.

Figure 4:
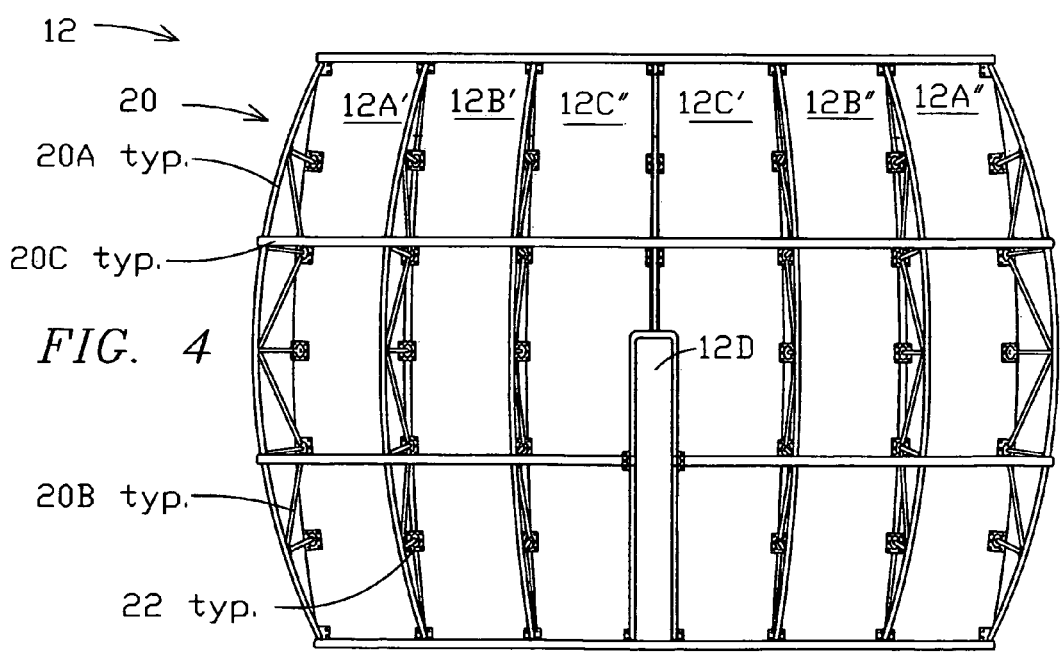
FIG. 4 is a rear elevation of the reflector dish structure of FIGS. 1-3.

FIG. 4 is a rear view of the dish structure 12 of FIG. 2 showing the rear side of the six reflector panels 12A-12C" along with the support structure consisting of seven arched Y-axis members 20A attached at their ends to the top and bottom panel edges and braced by a framework of typically smaller diameter straight tubes 20B attached to the panel by rectangular rear attachment plates 22, typically welded to tubes 20B and attached to the reflector panels 12A-12C" by fasteners such as screws, nuts and bolts, eyelets or rivets, spanning and overlapping the small gaps between adjacent reflector panels caused by their curvature, which due to their uniform width, causes adjacent panels to contact and abut each other only at top and bottom, as shown.

Figure 5:
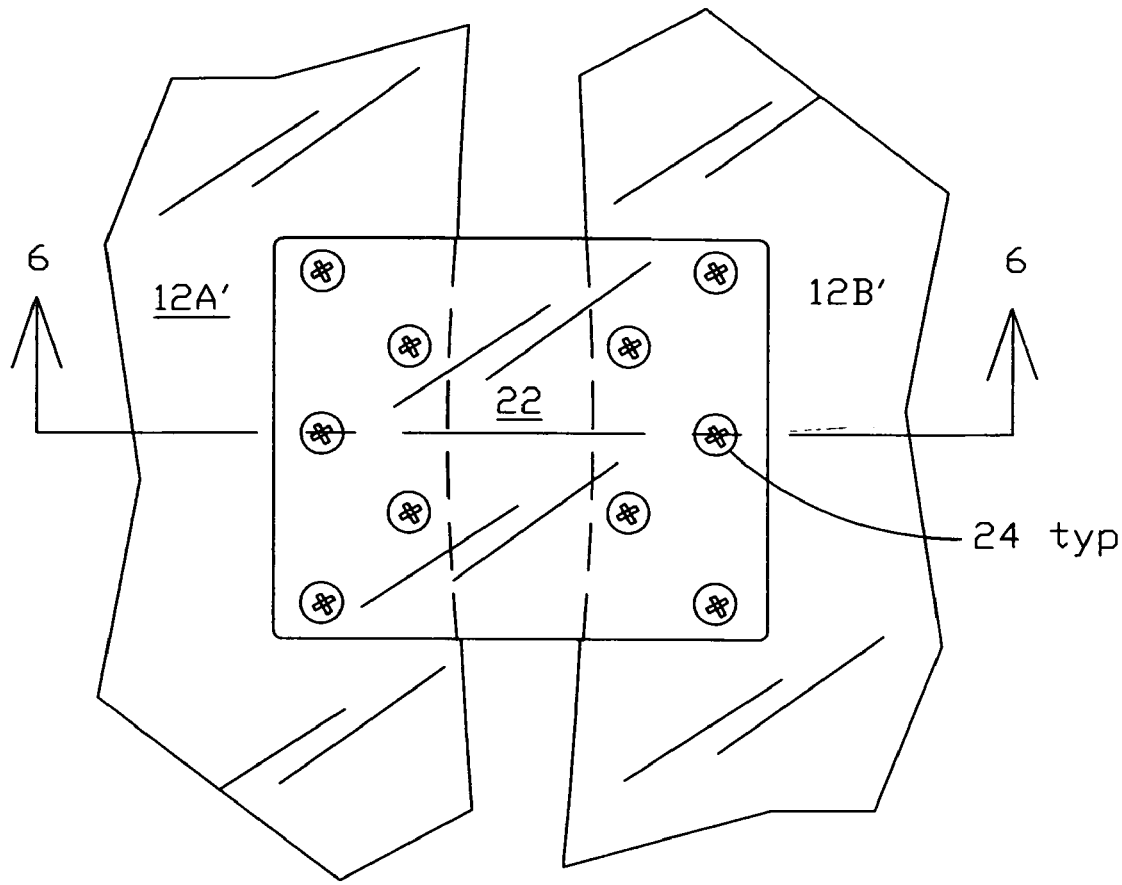
FIG. 5 is an enlarged front elevation of the reflector dish structure of FIGS. 1-4 showing a typical attachment plate.
Figure 6:
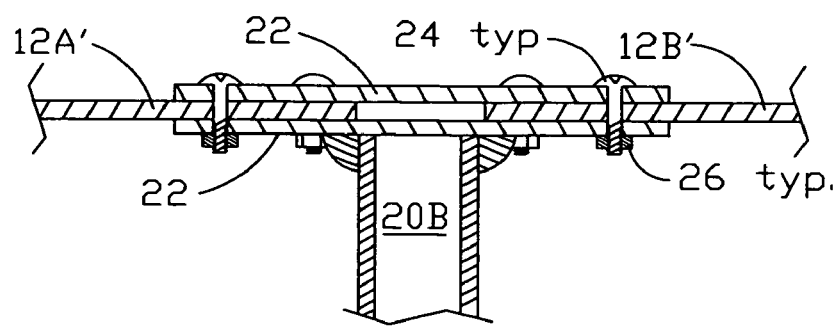
FIG. 6 is a cross-section taken at 6-6 of FIG. 5.

FIG. 5 is an enlarged front elevation of a portion of the reflector dish structure of FIGS. 1-4 showing a typical front attachment plate 22, spanning and overlapping the gap between two adjacent reflector panels, e.g. panels 12A' and 12B' as shown, fastened by a plurality of machine screws 24 traversing panels 12A' and 12B'. For location on the reflective side of the mirror dish panels 12A' and 12B' as shown, it is preferable for the exposed surface of attachment plate 22 to be made reflective, similar to the reflecting surfaces of the panels. As an alternative to the rectangular shape shown, plate 22 could be made and utilized effectively in a variety of other shapes such as square or other polygonal shape, elliptical, round etc, FIG. 6 is a cross-section taken at 6-6 of FIG. 5 showing a typical front attachment plate 22 on the upper side and a second similar rear attachment plate 22 on the lower side as a reinforcement, with the machine screws 24 engaging corresponding nuts 26 tightened against the rear attachment plate 22, which serves as an attachment tie point that is typically welded to one or more tubular support structure members such as spacer tube 20B shown.

Assuming the rear support structure consists of seven generally Y-axis arched Y-axis members 20A numbered consecutively 1-7, there are three identical pairs (1,7; 2,6; 3,5) and a central member (4) specially shaped with a bifurcated cutaway region to provide the clearance slot 12D seen in the lower central region, as in FIG. 3. The seven Y-axis sub-assemblies can be pre-assembled each with arched Y-axis members 20A and its associated bracing framework 20B, forming a set of crescent-shaped support sub-assemblies that are convenient in size for shipment to the site.

Each of the six crescent-shaped Y-axis support sub-assemblies flanking the central Y-axis support sub-assembly, as best seen at the left and right sides in FIGS. 1 and 3, includes in its support framework five spacer struts that are generally oriented in the X-axis and spaced approximately equidistantly apart, and four diagonal reinforcing struts extending between opposite ends of adjacent spacer pillars.

The overall reflector assembly and its framework are mirror-image symmetric about the central Y-axis axis, and apart from the region of the clearance slot 12D, mirror-image symmetric about the central horizontal axis.

On-site, the crescent-shaped support sub-assemblies are attached to the reflector panels 12A-12C" and then finally stabilized by the additional fastening at all intersections of five generally horizontal arched stringers 20C, of tubing typically larger in diameter than the arched Y-axis members 20A: an identical stringer pair top and bottom, the upper mid stringer (full length) and the lower mid co-linear pair of short length stringers, spaced apart at clearance slot 12D.

Generally all of the support structure members are of thin-wall tubing, preferably stainless or other metal such as aluminum, and secured together with suitable releasable fastenings such as machine screws and nuts that allow future maintenance, replacement or disassembly into sizes convenient for transporting in the event of relocation.

The overall size of the reflector dish structure 12 can be made generally within a range from 12 to 50 feet on a side. The structure shown as the preferred embodiment can be shaped to provide parabolic curvature that enables the focal point to be located at a distance from the center of the dish equal to about half the width or height of the reflector, i.e. substantially shorter focal length than found in conventional solar reflector dishes of known art.

Although it is considered preferable and most economical of material to make the reflector dish structure 12 approximately square, i.e. with an aspect ratio close to 1:1, as shown and described, the structural principles of the invention could be practiced to produce viable reflector dish structures with aspect ratios at least as high as 2:1 elongated in either the X-axis or the Y-axis.

The quantities of reflector panels and the quantities and arrangement of support structure members shown are considered optimal and exemplary, however the principles of the invention could be practiced successfully with quantities and arrangements other than as shown, as a matter of design choice.

The invention may be embodied and practiced in other specific forms without departing from the spirit and essential characteristics thereof. The present embodiments are therefore to be considered in all respects as illustrative and not restrictive, the scope of the invention being indicated by the appended claims rather than by the foregoing description; and all variations, substitutions and changes which come within the meaning and range of equivalency of the claims are therefore intended to be embraced therein.

What is claimed is:

1. A reflector dish assembly, for concentrating sun rays at a focal point, intended to be mounted in an adjustable manner with solar tracking mechanism that enables a central axis of said reflector dish assembly to remain directed to the sun and to follow movement of the sun, comprising:
    a quantity N of generally rectangular reflector panels, Y-axis oriented and arranged side-by-side to form a dish with a generally rectangular outline, each panel being pre-formed to provide a concave front surface in both X and Y axes, said reflector panels being shaped and mounted in a manner to collectively form a reflector dish having a shape closely approximating a symmetric revolution surface of a parabola about the central axis;
    each of said reflector panels being made of opaque non-frangible material with the concave front surface of each reflector panel being made highly smooth and reflective; and
    an overall structural framework comprising a quantity of N vertical subframes each having a pre-curved vertical rear structural member attached by front-to-back intermediate spacer members to a corresponding one of said reflector panels made and arranged to constitute a front structural subframe member thus forming a generally rigid overall dish structure suited for outdoor deployment as a solar reflector dish.

2. The reflector dish assembly as defined in claim 1 wherein:
    each of said reflector panels is of uniform width end-to-end, with the exception of a slot opening configured in a lower central region of said reflector dish assembly for clearance of ground mounting structure;
    each of said panels being made to extend to top and bottom end edges that are made substantially parallel with an X axis perpendicular to the Y axis; and
    each adjacent pair of said panels being made and arranged to abut each other at the top and bottom end, and thus, because of the uniform width and the curvature of the concave front surface, to create an open gap between side edges of each adjacent pair of said panels, the gap varying in width from zero at top and bottom end edges to maximum at a center point.

3. The reflector dish assembly as defined in claim 2 wherein the quantity N of said reflector panels is an even number, including a mirror-image pair of reflector panels flanking a vertical center line of said reflector dish assembly configured with cutaway lower regions to form the slot opening for clearance of ground mounting structure.

4. The reflector dish assembly as defined in claim 3 wherein said panel support structure comprises:
    a set of N generally flat, Y-axis oriented, crescent-shaped support frameworks each defined in outline by an arched vertical member attached at each end to corresponding top and bottom edges of the reflector dish, said frameworks extending rearward in a substantially perpendicular direction from said reflector panels, located generally at the open gap between adjacent pairs of said panels and at two opposite outer edges of said reflector dish;
    a plurality of spacer struts, in each crescent-shaped support framework, each extending generally perpendicularly from the reflector dish to a corresponding arched vertical member;
    a plurality of diagonal brace strut members extending between opposite ends of adjacent ones of said spacer pillars; and
    a central support framework located at the vertical center line of the reflector dish having an upper portion configured similar to the set of N support frameworks, and configured in a lower portion in a manner to conform with the slot opening for clearance of ground mounting structure.

5. The reflector dish assembly as defined in claim 4 further comprising:
    a plurality of attachment plates each made and arranged to attach an end of a corresponding one of said spacer struts to the reflector dish, typically spanning and overlapping the small gaps between the reflector panels, to which said attachment plates are attached in a manner to hold the panels together so as to form an integral reflector dish, and to enable the reflector dish to co-operate with said support frameworks as two essential inter-dependent structural components of said reflector dish assembly.

6. The reflector dish assembly as defined in claim 5 further comprising:
    a plurality of arched X-axis stringers spaced apart equidistantly, extending across behind and attached to corresponding ones of said arched Y-axis members.

7. The reflector dish assembly as defined in claim 6, comprising:
    a first reflector strip, having a shape A;
    a second reflector strip, having a shape B, disposed adjacent to said first reflector strip;
    a third reflector strip, having a shape C including a mounting clearance cutaway region, disposed adjacent to said first reflector strip at a side thereof opposite said first reflector strip;
    a fourth reflector strip, having a shape C', being a mirror image of shape C, disposed adjacent to said third reflector strip at a side thereof opposite said second reflector strip,
    a fifth reflector strip, having a shape B but inverted relative to said second reflector strip, disposed adjacent to said fourth reflector strip at a side thereof opposite said third reflector strip;
    a sixth reflector strip having a shape A but inverted relative to said first reflector strip, disposed adjacent to said fifth reflector strip at a side thereof opposite said fourth reflector strip: and
    seven crescent-shaped support frameworks including the central support framework, located respectively at corresponding edge regions of said reflector panels.

8. The reflector dish assembly as defined in claim 7 wherein six off-center ones of the seven crescent-shaped support frameworks each comprise five spacer struts and four diagonal brace struts.

9. The reflector dish assembly as defined in claim 8 wherein said arched X-axis stringers are spaced apart in a plurality of approximately equidistant spacings.

10. A method of fabricating a large reflector dish assembly that utilizes on-site final assembly of a plurality of sub-assemblies of smaller size to facilitate transportation to a ground site having a ground support, comprising the steps of:

(1) procuring a set of flat elongate generally rectangular panels;

(2) forming the panels to corresponding curvature shapes predetermined to form, in combination, a concave front surface with a desired parabolic dish curvature when the panels are oriented upright and arranged in a row side-by-side;

(3) providing a reflecting surface on the concave front surface of each panel;

(4) prefabricating a corresponding set of crescent-shaped panel support frameworks, each fitted with a set of rear attachment plates affixed to the frameworks made and arranged to conform to the desired parabolic dish curvature when deployed upright in a row behind the panels, one panel support framework to be located at each edge interface between adjacent side-by-side panels and one panel support framework to be located at each end edge of the row of panels;

(5) providing a set of front attachment plates, generally replicating the rear attachment plates, including a set of fasteners for attaching each rear attachment plate to a corresponding front attachment plate with the fasteners traversing a corresponding openings configured in the panel;

(6) providing a set of rear stringer members made and dimensioned to extend horizontally across the rear side of the row of panel support frameworks;

(7) providing a ground support structure, a receptor and a receptor support framework;

(8) transporting a kit of components including the set of panels, the panel support frameworks, the front attachment plates, the fastening hardware, the stringer members, the ground support structure, the receptor and the receptor support framework to the site;

(9) attaching the shaped, reflecting-surfaced panels sequentially to the panel support frameworks via front/back pairs of attachment plates arranged in an array, each pair secured together by a plurality of fasteners traversing the panels; and

(10) installing the rear stringer members spaced apart and extending horizontally across the rear side of the row of upright panel support frameworks, each stringer fastened to each panel support framework at an intersection there between.

* * * * *